(No Model.)

T. F. HALL.
DRIVE CHAIN.

No. 407,655. Patented July 23, 1889.

Witnesses:
E. P. Ellis,
L. L. Burket.

Inventor:
Theo. F. Hall,
per
J. A. Lehmann,
Atty

UNITED STATES PATENT OFFICE.

THEODORE F. HALL, OF MARIETTA, OHIO, ASSIGNOR TO JOHN SHORT, OF SAME PLACE.

DRIVE-CHAIN.

SPECIFICATION forming part of Letters Patent No. 407,655, dated July 23, 1889.

Application filed March 18, 1889. Serial No. 303,722. (No model.)

*To all whom it may concern:*

Be it known that I, THEODORE F. HALL, of Marietta, in the county of Washington and State of Ohio, have invented certain new and useful Improvements in Links for Drive-Chains; and I do hereby declare the following to be a full, clear, and exact description of the invention, such as will enable others skilled in the art to which it pertains to make and use it, reference being had to the accompanying drawings, which form part of this specification.

My invention relates to an improvement in links for drive-chains; and it consists in the combination of the links with two coupling-clasps, each one of which has a slot in its side, and which clasps are placed in reverse positions to each other, so that the slots will be upon opposite sides of the links, as will be more fully described hereinafter.

The object of my invention is to connect the links of drive-chains together by two links, instead of one, as has heretofore been the custom, so as to make it impossible for the links to become separated while in use, and yet require no tools to disconnect them when it is desired to do so.

Figure 1:
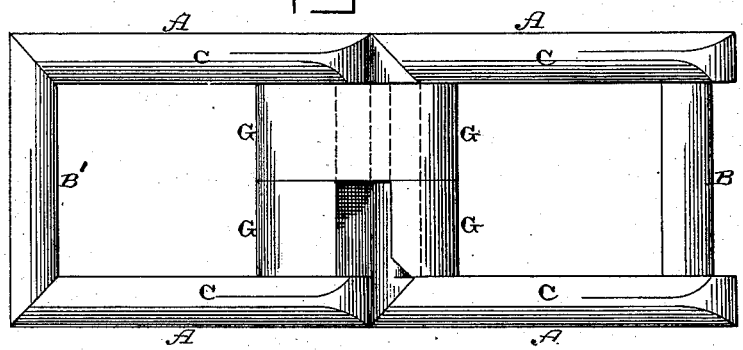
Figure 2:
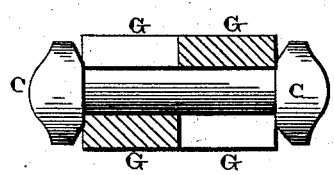
Figure 3:
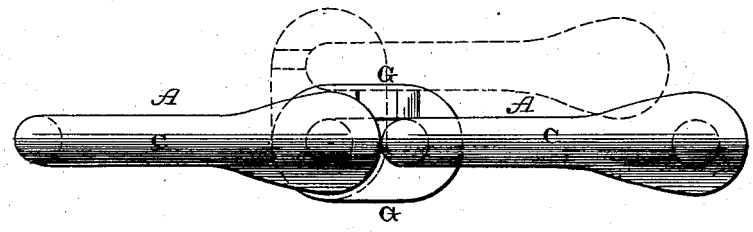
Figure 4:
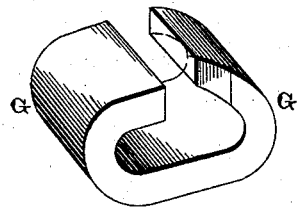

Figure 1 is a plan view of a link which embodies my invention. Fig. 2 is a cross-section of the same. Fig. 3 is a side view. Fig. 4 is a perspective of one of the clasps.

A represents the links, which have plain end bars B and the ends of the side braces C, widened at one end of the link in the usual manner. The inner edges of the widened portions are beveled away, as shown, so that the clasps can be readily attached and detached.

The coupling-clasps are shown at G. They are fitted to connect the end bars of the links on the same general principle of chains of this class. They are of link form with the usual transverse slots on the sides, as shown in Fig. 4, being approximately of C shape. These transverse slots are fitted to receive the end B' of the link, and for convenience of manipulation a corner is beveled off at the junction of the face of one of the slots with the side, as shown in Fig. 4. Two of these clasps being intended to connect each pair of links, they are fitted in width for the purpose and preferably of equal width. I have shown the slots as made a little nearer one end of the clasp than the other; but I do not limit myself to this arrangement. The clasps are placed upon the links, as shown in Figs. 1 and 2, side by side, but with the slotted face reversed. This arrangement effectually prevents accidental displacement. In placing the clasps upon the links for the purpose of connecting them I first put on one clasp, placing it upon the bar at the enlarged end of the links, using, preferably, first the one without the bevel. I then join to this the smaller end B' of the other link. Then I place upon the enlarged end of the first link the second clasp, with its slotted face reversed as to the first clasp, the second link being then slipped into place by side movement to complete the connection. In this position the links are firmly united and are not liable to accidental displacement.

I am aware that single coupling-clasps have been heretofore known in links of this general form.

I claim as my invention—

In combination with the links of a driving-chain, a pair of coupling-clasps transversely slotted and of approximately C shape and arranged upon the links side by side with the slots in opposite sides of the clasps, substantially as described.

In testimony whereof I affix my signature in presence of two witnesses.

THEODORE F. HALL.

Witnesses:
 J. B. HOVEY,
 JNO. H. RILEY.